(12) United States Patent
Thorndyke

(10) Patent No.: US 9,993,111 B2
(45) Date of Patent: Jun. 12, 2018

(54) PORTABLE COMBINATION COOKING, GRILLING, COOLING, WARMING AND STORAGE UNIT

(71) Applicant: Robert John Thorndyke, Brighton (CA)

(72) Inventor: Robert John Thorndyke, Brighton (CA)

( * ) Notice: Subject to any disclaimer, the term of this patent is extended or adjusted under 35 U.S.C. 154(b) by 0 days. days.

(21) Appl. No.: 15/417,288

(22) Filed: Jan. 27, 2017

(65) Prior Publication Data

US 2017/0325633 A1 Nov. 16, 2017

(51) Int. Cl.
*A47J 37/06* (2006.01)
*A23L 5/10* (2016.01)
*A47J 36/02* (2006.01)

(52) U.S. Cl.
CPC ............ *A47J 37/0647* (2013.01); *A23L 5/10* (2016.08); *A47J 36/02* (2013.01); *A47J 37/0664* (2013.01); *A23V 2002/00* (2013.01)

(58) Field of Classification Search
CPC .... A47J 37/0647; A47J 36/02; A47J 37/0664; A47J 37/0713; A47J 37/07; A23L 5/10; A23V 2002/00
See application file for complete search history.

(56) References Cited

U.S. PATENT DOCUMENTS 8,490,614 B1 * 7/2013 Gregory .............. A47J 37/0754
126/1 R

* cited by examiner

*Primary Examiner* — Alfred Basichas
(74) *Attorney, Agent, or Firm* — Eric L. Lane; Green Patent Law

(57) ABSTRACT

A portable combination cooking and storage unit having: a housing having at top, a bottom, a front, a back and two sides, and at least one access door at the front; at least two stackable removable grilling trays containable within the housing; at least one removable storage tray containable within the housing; wherein each of the at least two removable grilling trays have at least one burner, a cooking grid proximate the at least one burner, and at least one burner control for controlling fuel to the at least one burner.

20 Claims, 12 Drawing Sheets

PORTABLE COMBINATION COOKING, GRILLING, COOLING, WARMING AND STORAGE UNIT

FIELD OF THE DISCLOSURE

This disclosure relates to a portable combination cooking, grilling, cooling, warming and storage unit and method of using same.

BACKGROUND

Current portable cooking units lack the ability to allow for numerous cooking surfaces that may be individually regulated. Current units also lack the ability to allow for storage of food items in either a cold or warm/hot environment. Furthermore, current units lack the ability to house the numerous cooking surfaces in a single unit to allow for facile portability and storage. There is a need for a portable cooking, grilling, warming, cooling and storage unit.

SUMMARY

According to one aspect, there is provided a unitary portable combination cooking, grilling, warming, cooling and storage unit comprising:
a housing, preferably having a top, a bottom, a front, a back and two sides, and at least one access door, preferably at said front;
at least two stackable removable grilling trays containable within said housing, preferably said at least two stackable removable grilling trays are spaced apart a predetermined distance from each other when contained within said unit;
at least one removable storage tray containable within said housing, preferably said at least one removable storage tray is spaced apart a predetermined distance from said at least two stackable removable grilling trays when contained within said unit;
wherein each of said at least two removable grilling trays comprise at least one burner, a cooking grid proximate said at least one burner, said cooking grid for receiving items for at least one of cooking, grilling, warming, cooling, storage and combinations thereof, said cooking grid having a top surface and a bottom surface, preferably said cooking grid being removable, preferably said at least one burner being proximate the bottom of said cooking grid, and at least one burner control for controlling fuel to said at least one burner.

In a preferred embodiment, said unit further comprises at least one temperature gauge with a temperature indicator visible outside said unit for measuring internal temperature of said unit and communicating the internal temperature to a user. In another embodiment, said unit further comprises a moisture gauge for monitoring the moisture level in said unit. In yet another embodiment, said unit further comprises a timer for setting a predetermined period of time.

In yet another preferred embodiment, each of said at least two grilling trays further comprise a shield, preferably between said at least one burner and said cooking grid, preferably between said at least one burner and said bottom surface of said cooking grid, for reducing contact of food items and/or liquid with said at least one burner. Preferably said shield is for reducing flare ups during the cooking/grilling process.

In yet another preferred embodiment, said unit further comprises at least one rotisserie attachment to allow for rotisserie of at least one comestible item within said unit. Preferably said at least one rotisserie attachment comprises an attachment at one side of said unit and a complimentary attachment at another side of said unit, for receiving a rotisserie shaft and allowing for rotation of said rotisserie shaft.

Preferably, said unit further comprises at least one handle, preferably telescopic, for transporting said unit. More preferably said unit further comprises at least one wheel, preferably two wheels, more preferably four wheels proximate said bottom of said unit for transporting said unit along a surface.

In a preferred embodiment, said housing, each of said grilling trays, said cooking grid, said shield is made of a material preferably capable of withstanding up to 700 degrees Fahrenheit, more preferably selected from the group consisting of stainless steel, magnesium alloys, water hardened steel, chromoly 4130, copper, vanadium, nickel, tungsten, Ultrathin®, platinum, titanium, carbon steel brass, aluminum or other suitable materials, more preferably aluminum of grade 061, and combinations thereof.

Preferably, said unit further comprises a secondary access door, preferably at the front of said unit and proximate the bottom of said unit, for allowing access to the bottom of said unit and to said burner control of said at least one grilling tray, preferably when said unit is used as an oven.

Preferably, each of said at least two stackable removable grilling trays are separated a predetermined distance from each other and at least one storage tray is separated a predetermined distance from each of said at least two stackable removable grilling trays.

According to another aspect, there is provided the use of the unit described herein for cooking, keeping warm, storing and combinations thereof of at least one comestible inside said unit.

According to another aspect, there is provided the use of the unit described herein for cooling of at least one comestible inside said unit.

According to yet another aspect, there is provided a method of cooking an item in the unit described herein comprising:
Introducing one grilling tray into said unit proximate the bottom of said unit;
Introducing one storage tray into said unit and above said one grilling tray;
Introducing an item to be cooked proximate said storage tray;
Igniting said burner of said one grilling tray;
Optionally closing said access door;
Cooking said item a predetermined time; and optionally
Turning off said burner.

According to yet another aspect, there is provided a method of cooking a plurality of items on each of said at least two stackable removable grilling trays comprising:
Removing each of said at least two stackable grilling trays from said unit;
Placing each of said at least two stackable grilling trays on a surface;
Igniting at least one burner of each of said grilling trays allowing for cooking said items on said grilling trays.

According to yet another aspect, the unit may be manufactured by use of tinsmith, bending, stamping, water jet and other forms of metal forming/bending techniques as would be understood by a person of skill in the art.

DETAILED DESCRIPTION

The figures contained herein are protected under copyright by copyright holder Robert John Thorndyke.

Figure 1:
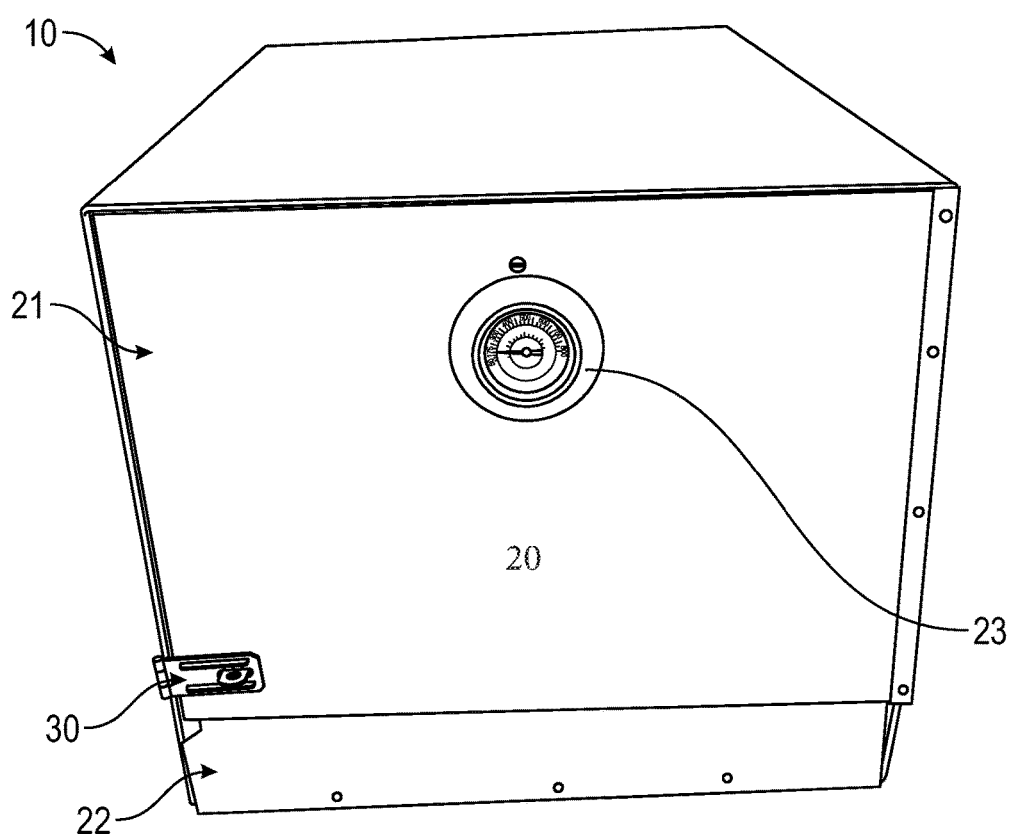
FIG. 1 is a view of the front of the unit according to one embodiment
Figure 2:
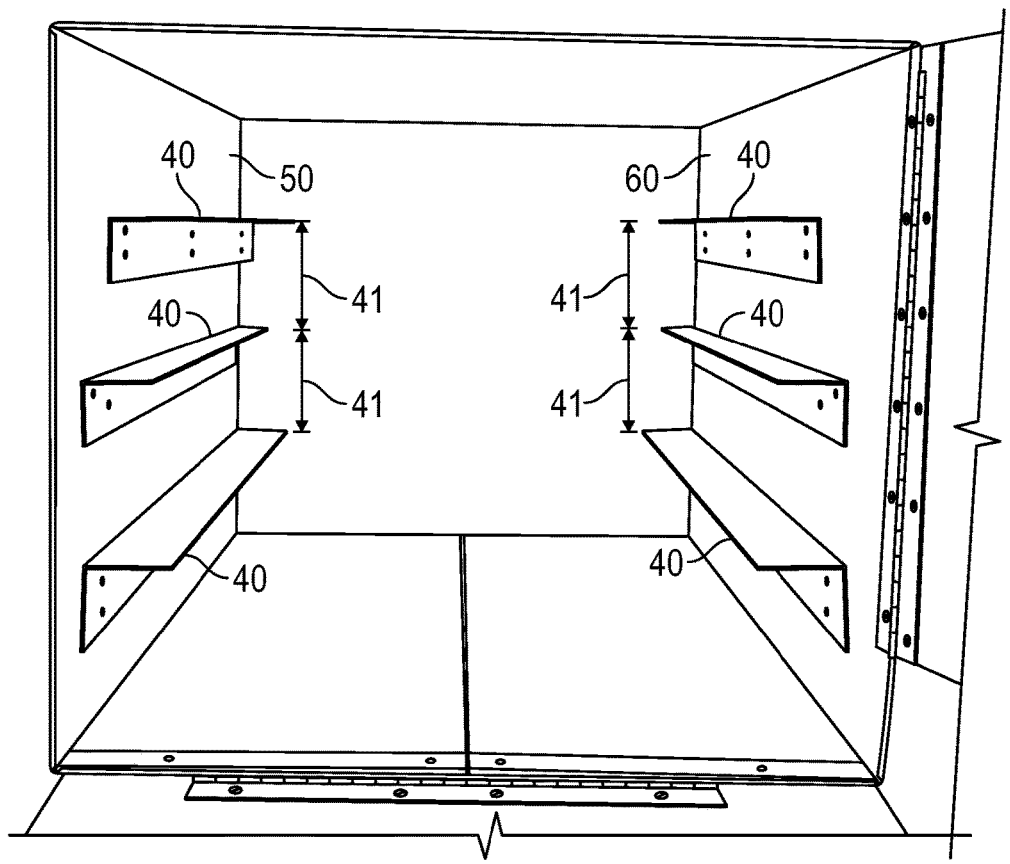
FIG. 2 is a view of the inside of the unit when empty according to one embodiment

Referring now to FIGS. 1 and 2, there is provided a portable combination cooking, grilling, warming, cooling and storage unit 10 in the shape of a box container (other shapes suitable to accommodate the following may also be used). The front 20 of the unit includes a first access door 21 and a second access door 22. Access door 21 is hinged at one side of the unit 10. Access door 22 is hinged at the bottom of the unit 10. The first access door 21 is larger and located above the second access door 22. Located on the front access door 21 is a temperature gauge 23 for measuring the internal temperature of the unit 10, although the temperature gauge 23 may located at other areas of the unit. Also located on the front access door 21 is a locking mechanism 30 to ensure the unit 10 is secure when being transported. In this embodiment, the locking mechanism 30 is a latch type mechanism, however any suitable locking mechanism may be used herein.

Referring now to FIG. 2, both the first and second access doors 21, 22 are open and an empty unit 10 is show. Inside the unit 10 are as series of spaced apart tray supports. In this embodiment the spaced apart tray supports are shelves 40, although any suitable support may be used herein. On one side 50 of the unit 10 are three shelves 40 spaced apart from each other. One the opposing side 60 of the unit 10 are three shelves 40 spaced apart from each other to complement the shelves 40 of side 50 and to provide for either a grilling tray 70 and/or storage tray 80 and/or burner tray 90 to be substantially level when in the unit 10. Each of the shelves 40 runs substantially the length of each side 50 and 60. In this embodiment, each of the shelves 40 are "L" shaped but may be of any shape to accommodate the trays 70, 80 and/or 90. In this embodiment, the shelves 40 are secured in place along the inside walls of the unit by rivets but may also be secured in place by welding, spot welding and combinations thereof or the like as understood by a person skilled in the art. The spacing 41 between shelves 40 at each side 50 and 60 is such that it accommodates the facile insertion and removal of either a grilling tray 70, storage tray 80 and/or burner tray 90.

Figure 3:
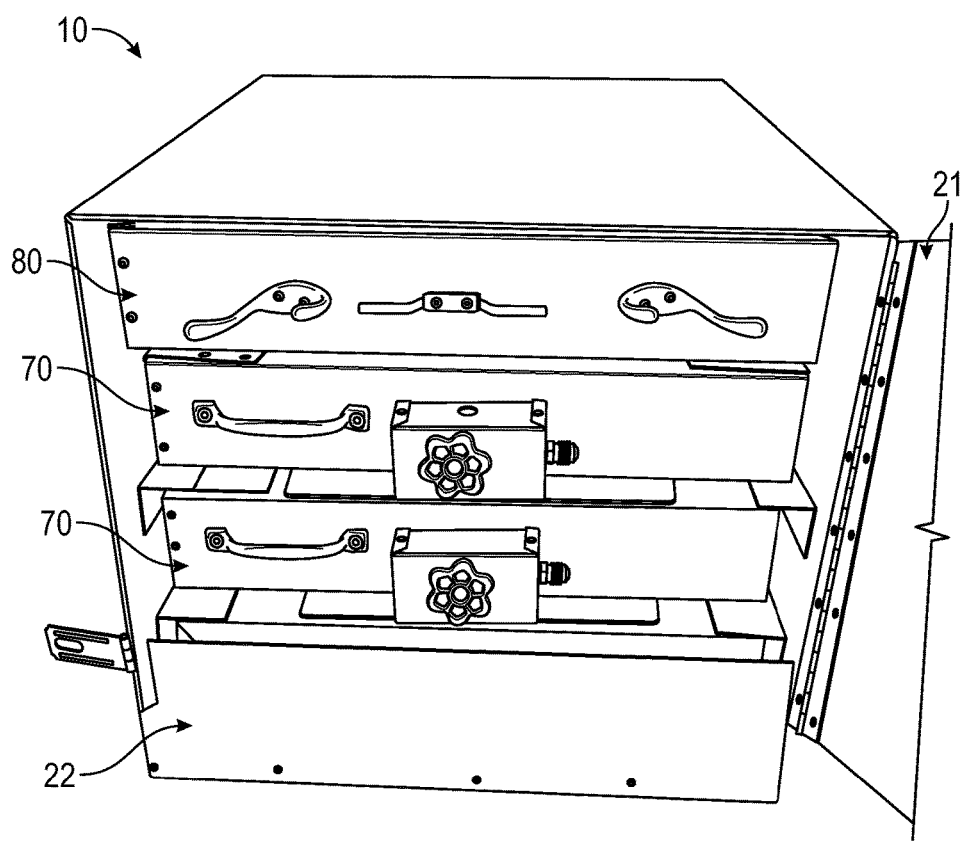
FIG. 3 is a view of the inside of the unit with all trays inside and secondary access door closed according to one embodiment
Figure 4:
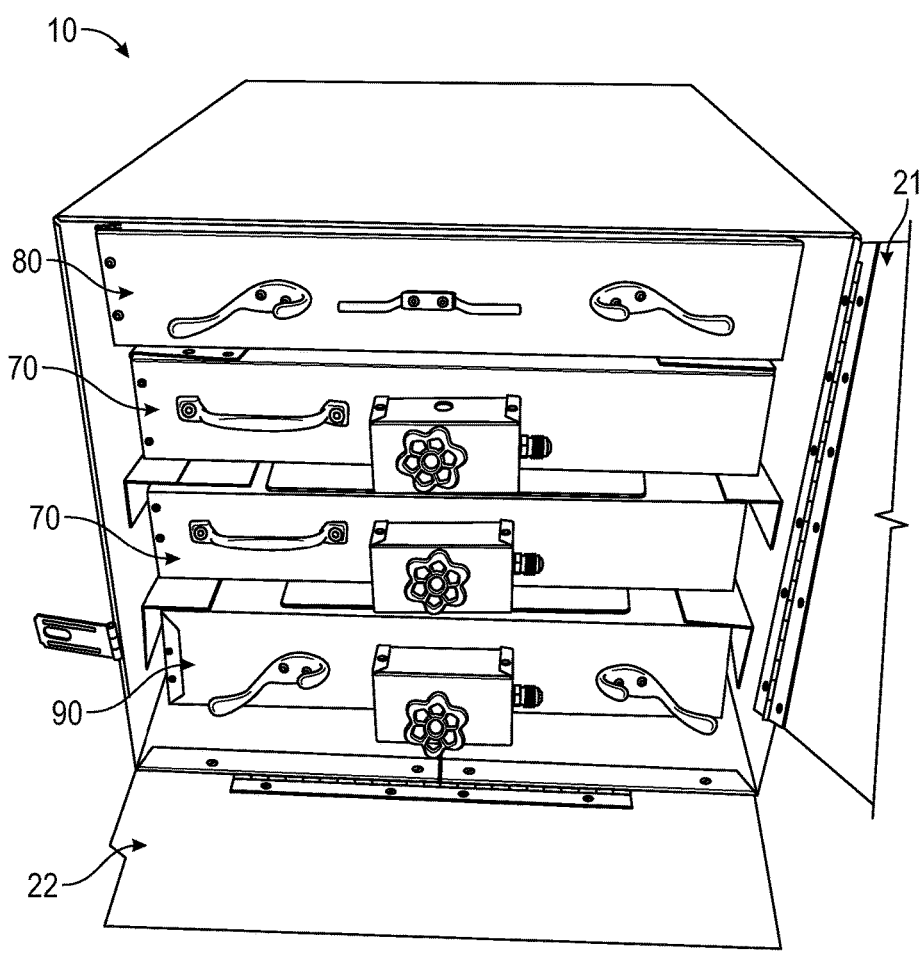
FIG. 4 is a view of the inside of the unit with all trays inside and secondary access door open according to one embodiment

Referring now to FIGS. 3 and 4, there is provided an open view of the unit 10 depicting the grilling trays 70 and storage tray 80 in the unit 10. In FIG. 3, the secondary access door 22 is in the closed position. In FIG. 4, the secondary access door 22 is in the opened position and the burner tray 90 is seen.

Figure 5:
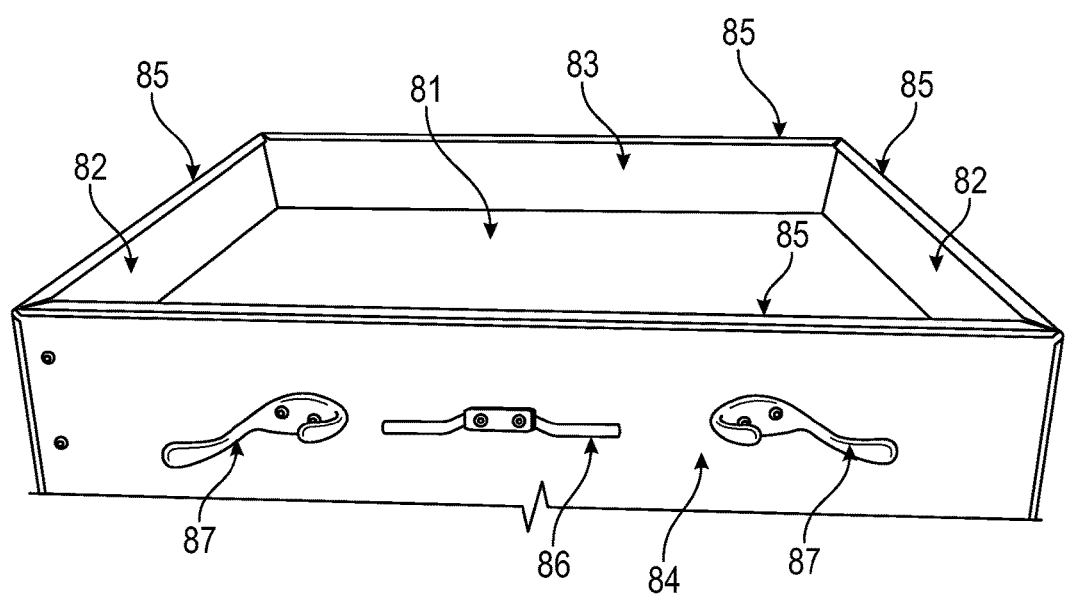
FIG. 5 is a view of a warming tray according to one embodiment

As can best be seen in FIG. 5, the storage tray 80 comprises a substantially square bottom 81, two side walls 82, a back wall 83 and a front wall 84 forming a chamber within the storage tray 80. At the top end of each wall 82, 83, 84 there is a flange 85 running along the length of each wall, for strengthening the tray 80. The front 84 of tray 80 includes a handle 86 and two hooks 87 saddling said handle 86. The hooks 87 are used to wrap a portion of a fuel hose (not shown) when the trays 70 and 80 are in storage in the unit 10. The storage tray 80 may be used to store food in the unit and when used in combination with a burner tray 90, items in the storage tray 80 may be cooked and/or kept warm in the unit 10. In practice, for keeping food warm, storage tray 80 is placed in the unit above burner tray 90. Burner tray 90 is preferably placed at the inside bottom of the unit 10. Access door 21 is kept closed during the cooking or warming process. Access door 22 may also be kept closed and when adjustment of temperature in the unit 10 is required, access door 22 may be opened to adjust the temperature of burner tray 90. An alternative is to keep items in the unit cool and/or cold by placing ice in the storage tray 80 and placing the storage tray 80 on an upper shelf and placing food items to be kept cool/cold beneath storage tray 80, preferably on the bottom of the unit 10, although food items may be placed above the storage tray 80. In either instance, both doors 21, 22 may be kept closed and the unit 10 acts as a cooler for storage of food items.

Figure 6:
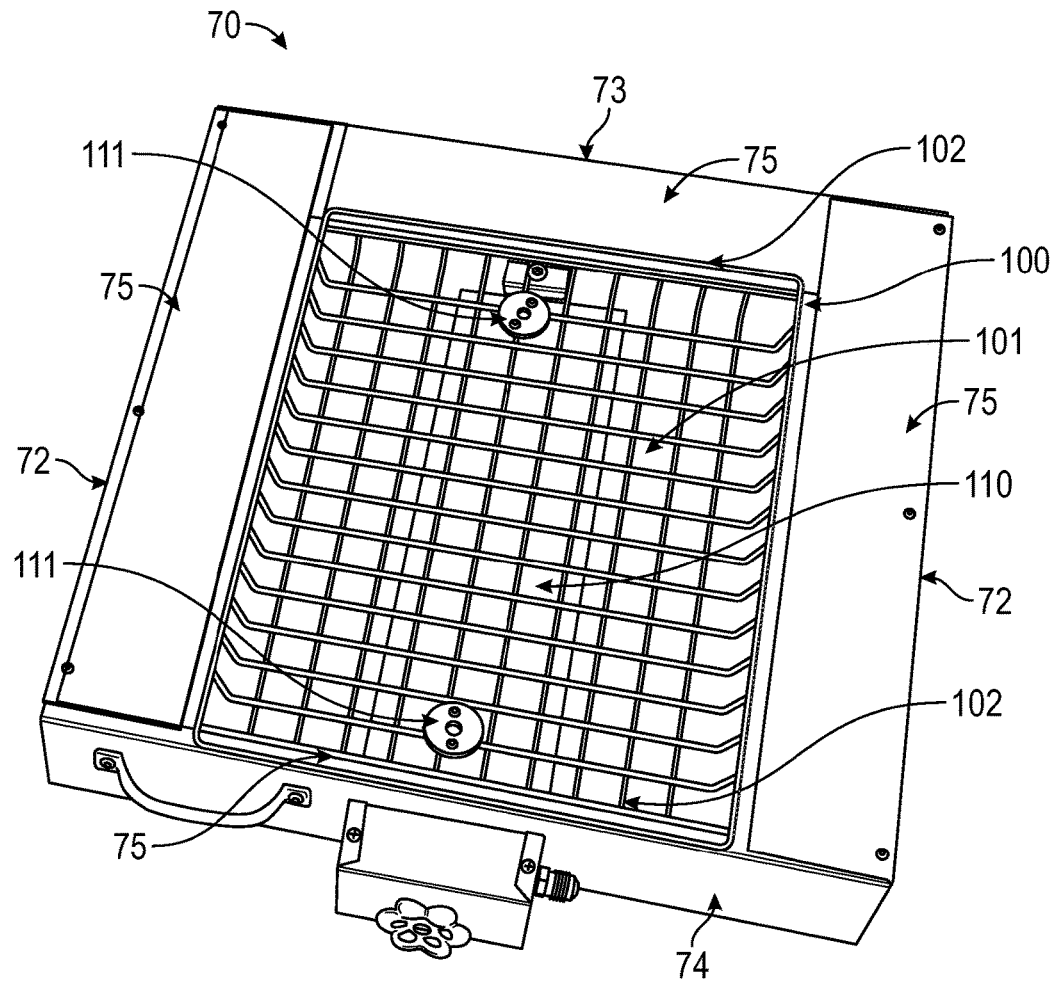
FIG. 6 is a view of the grilling tray according to one embodiment
Figure 7:
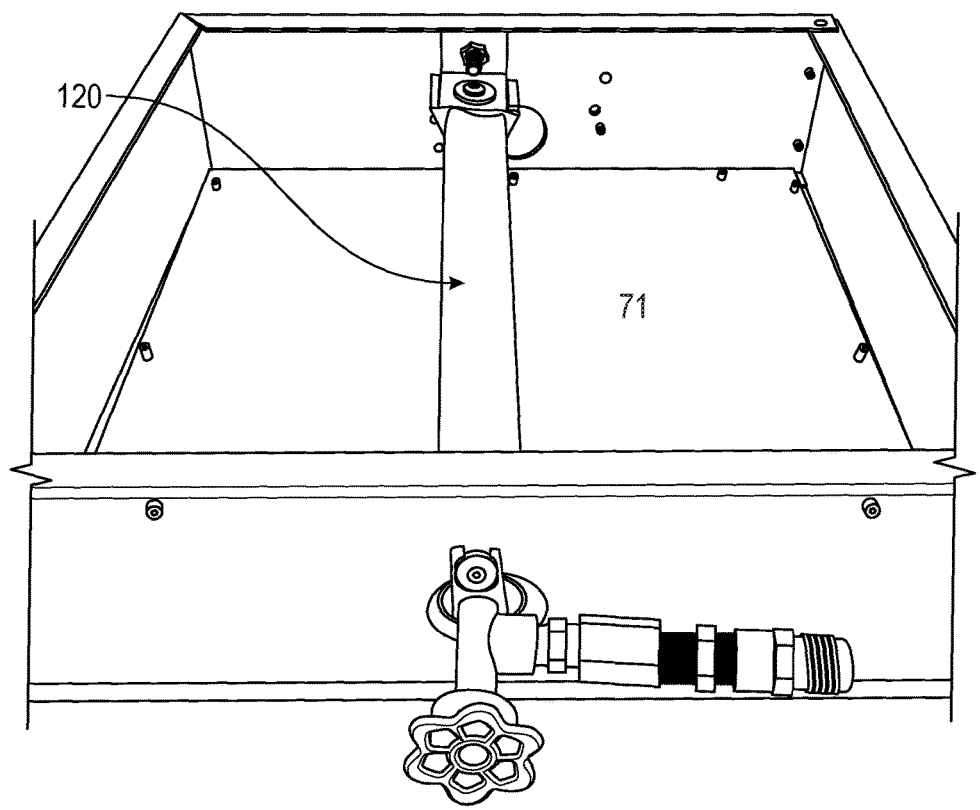
FIG. 7 is a view of the grilling tray of FIG. 6 without the cooking grid according to one embodiment

Referring now to FIGS. 6 and 7, there is provided a grilling tray 70. Grilling tray 70 comprises a bottom 71, two side walls 72, a back wall 73 and a front wall 74, forming a chamber within the grilling tray 70. At the top of the back wall 73, two side walls 72 and front wall 74, there is a flange 75 running along the length of each wall, for strengthening the tray 70 and concentrating heat in the chamber of the grilling tray 70. The flange being less wide at the front wall 74 than the flange at the back wall 73 and two side walls 72. The opening formed by the flange 75 allows for support of a removable cooking grid 100. The cooking grid 100 is a mesh type grid to allow support of the item to be cooked and/or grilled while allowing heat to contact the item to be cooked. The cooking grid in this instance, is a perforated basket 101 with a flange 102 at the front and back of the basket 101 to allow for support of the basket 101 on the flange 75 at the front 75 and back 73 walls. The cooking grid 100 further comprises a shield 110 which runs along the bottom of said cooking grid 100 and is aligned to sit a predetermined distance above the burner 120. In this embodiment, the shield 110 is rectangular in shape and is narrower than the cooking grid 100 such that the shield 110 reduces the likelihood of food particles and liquids, such as liquids produced during the cooking and/or grilling process from making contact with the burner 120 (which could result in flare ups) while allowing for heat to contact the item to be cooked. In this instance, the shield 110 is connected to the cooking grid 100 by a pair of screw connectors 111 each being proximate an opposite end of the shield 110.

Referring now to FIG. 7, a burner 120 is seen in a grilling tray 70 with the cooking grid 100 removed. The burner 120 is a conventional gas burner used in cooking units and know to persons of ordinary skill in the art. When the cooking grid 100 is removed from said grilling tray 70, the grilling tray 70 may be used as a heat source (or as a burner tray 90 or 140) at the bottom of the unit 10 to keep items warm in the storage tray 80 when inserted above the grilling tray 70. Given the shelves 40 are at various heights in the unit 10, the user may select the appropriate level to place the grilling tray 70 to keep items warm.

Grilling tray 70 may also be used to store a griddle 141 (see FIG. 8) when not in use. Griddle 141 is placed above the burner 120 and the cooking grid 100 is placed above the griddle 141 and the tray 70 is then placed inside the unit 10 for storage and transportation.

Figure 8:
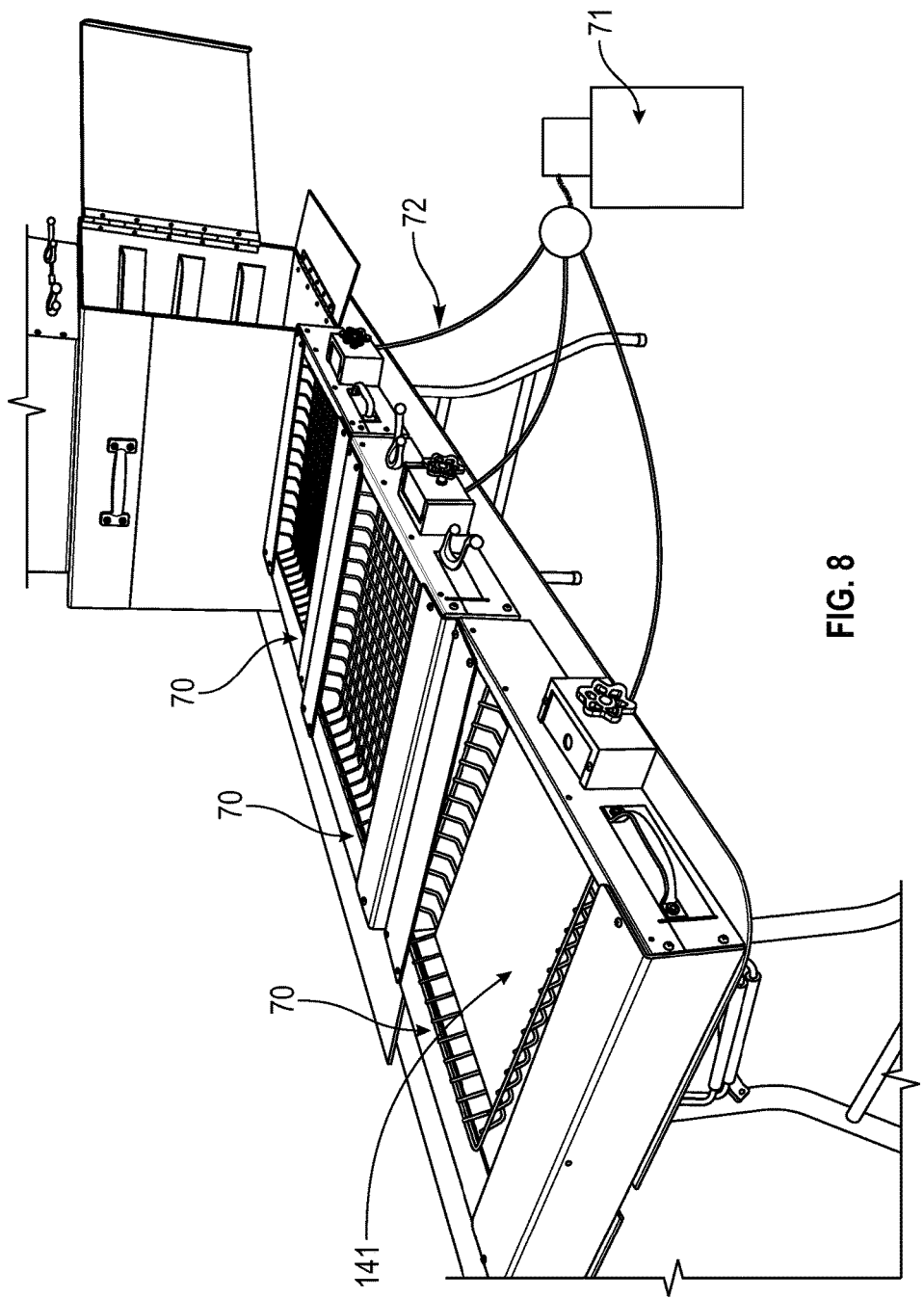
FIG. 8 is a view of three grilling trays in use according to one embodiment
Figure 10:
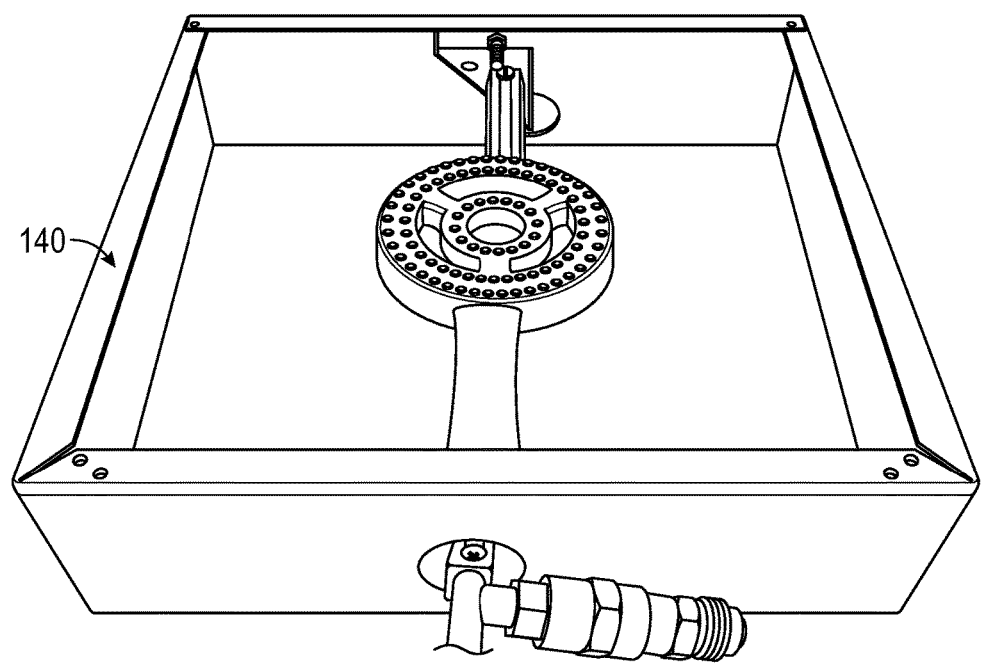
FIG. 10 is a view of a warming burner tray according to one embodiment

Referring now to FIG. 8, there is shown three grilling trays 70 side by side to allow for cooking various items simultaneously. The trays 70 are each connected to a fuel source 71, such as a fuel tank, by fuel passageways 72, such as appropriate hoses. In this manner, depending on the item being cooked, the user will adjust the individual burner control 130 to regulate the heat to each grilling tray 70. If desired, the user can also use a side burner tray 140 (see FIG. 10) to cook items in a pot or pan (not shown) or griddle 141 on a grilling tray 70.

Figure 9:
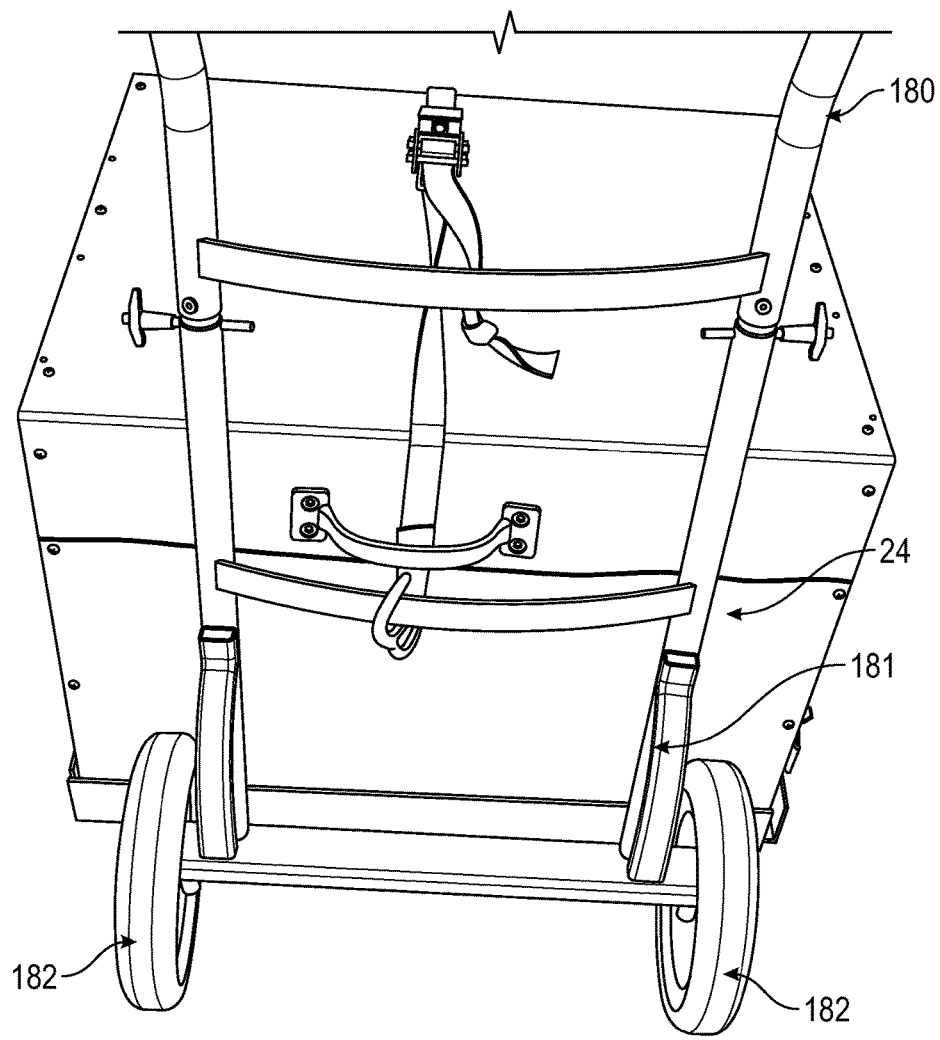
FIG. 9 is a view of the unit with wheels and a telescopic handle according to one embodiment

FIG. 9 depicts the unit 10 with an optional telescopic spaced apart handle 180 connected to the back wall 24 of the unit 10. The handle 180 has proximate the bottom 181 thereof a pair of wheels 182 to facilitate moving the unit 10 along a surface. The handle 180 and wheels 182 are made of a material that is light and also resistant to heat. The handle may be integral to the unit 10 or it may be removable to facilitate cleaning as well as storage of the unit 10.

Although not shown in the Figures, the unit 10 may also be used as an ice box to keep items cold. In this instance, the used would place ice in the storage tray 80 and place the storage tray 80 containing the ice on a shelf above the items to be kept cold.

Figure 11:
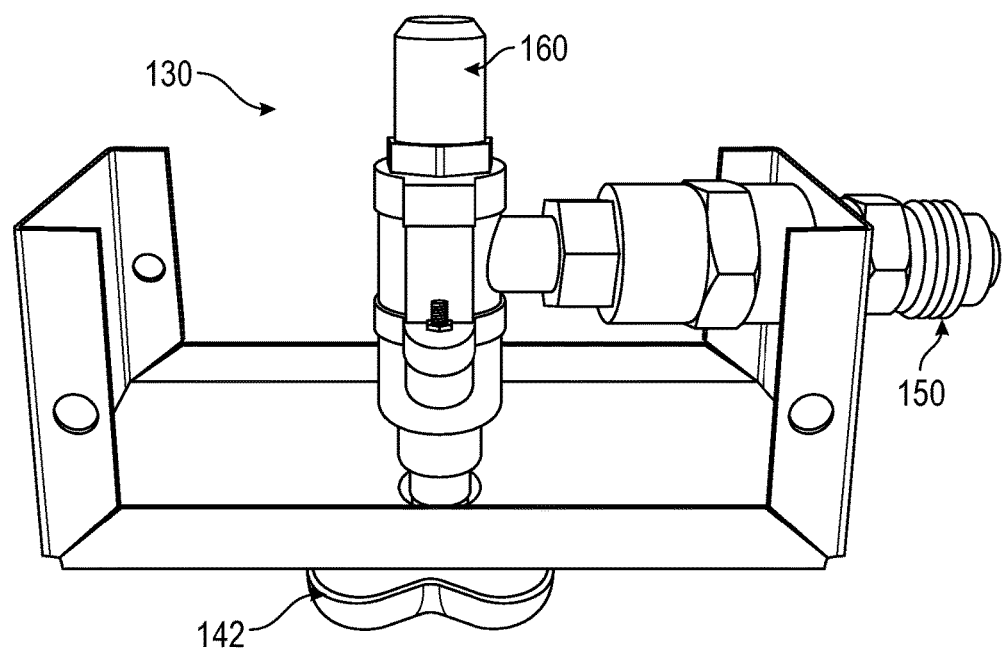
FIG. 11 is an exploded view of the burner control according to one embodiment

FIG. 11 depicts a typical burner control 130, which includes a burner handle 140, a fuel inlet connection 150 and a fuel outlet connection 160. Each connection 150 and 160 may be quick connects or any suitable connector as understood by a person skilled in the art.

Figure 12:
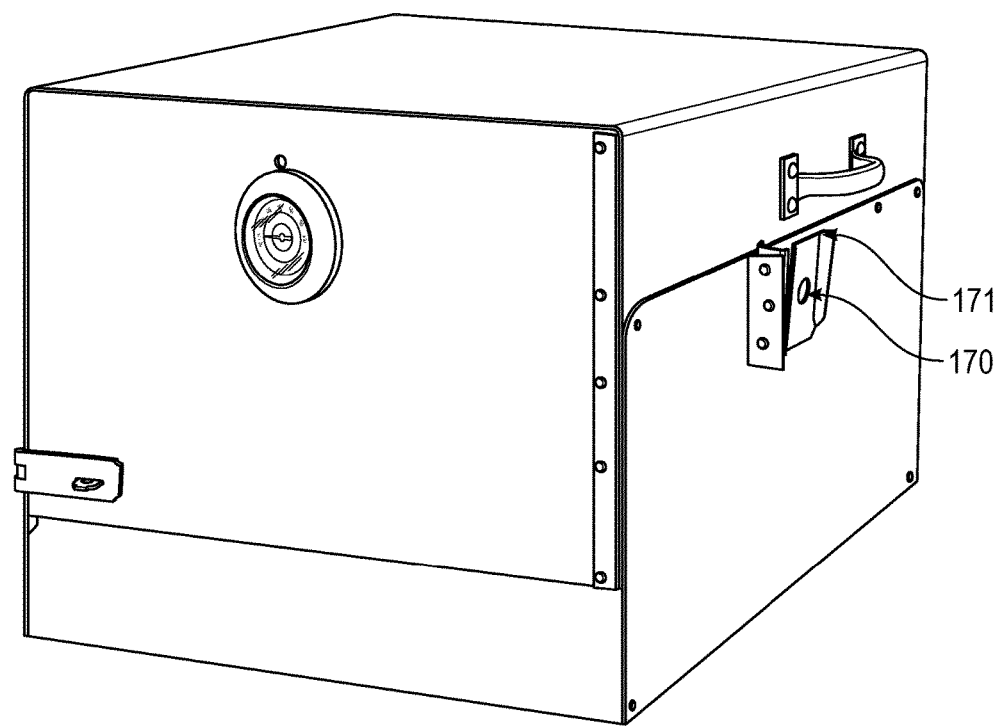
FIG. 12 is a view of the rotisserie attachment according to one embodiment

FIG. 12 depicts a perspective view of the unit 10 with a rotisserie shaft receiver 170 on each side wall 50 and 60. This allows for receiving a rotisserie shaft (not shown) and using the unit 10 as a rotisserie oven. The receiver 170 also includes a bracket 171 to allow the unit 10 to receive a rotisserie motor (not shown).

The unit is preferably made of stainless steel, aluminum and other materials listed herein or combinations thereof such that structural integrity and safety of the unit 10 is not compromised As many changes can be made to the preferred embodiment without departing from the scope thereof; it is intended that all matter contained herein be considered illustrative and not in a limiting sense.

The invention claimed is:

1. A unitary portable combination cooking and storage unit comprising:
    a housing;
    at least two stackable removable grilling trays containable within said housing;
    at least one removable storage tray containable within said housing;
    wherein each of said at least two removable grilling trays comprise at least one burner, a cooking grid proximate said at least one burner, and at least one burner control for controlling fuel to said at least one burner.

2. The unit of claim 1 wherein said housing further comprises a top, a bottom, a front, a back and two sides, and at least one access door, and at least one temperature gauge with an indicator visible outside said unit for measuring the temperature inside said unit.

3. The unit of claim 1 wherein each of said at least two grilling trays further comprise a liquid shield between said at least one burner and said cooking grid for reducing liquid contact with said at least one burner.

4. The unit of claim 1 further comprising a rotisserie attachment to allow for rotisserie of at least one comestible item within said housing.

5. The unit of claim 1 further comprising at least one handle for carrying said unit.

6. The unit of claim 5 wherein said at least one handle is telescopic.

7. The unit of claim 1 further comprising at least one wheel proximate said bottom.

8. The unit of claim 1 wherein said housing is made of a material selected from the group consisting of stainless steel, magnesium alloys, water hardened steel, chromoly 4130, copper, vanadium, nickel, tungsten, Ultrathin®, platinum, titanium, carbon steel brass, aluminum and combinations thereof.

9. The unit of claim 8 wherein said aluminum is 061 grade aluminum.

10. The unit of claim 9 wherein each of said grilling trays and said storage tray is made of a material selected from stainless steel, magnesium alloys, water hardened steel, chromoly 4130, copper, vanadium, nickel, tungsten, Ultrathin®, platinum, titanium, carbon steel brass, aluminum and combinations thereof.

11. The unit of claim 1 further comprising a secondary access door proximate the bottom of said unit for allowing access to said burner control of said at least one grilling tray.

12. The unit of claim 1 wherein each of said at least two stackable removable grilling trays are separated a predetermined distance from each other.

13. The unit of claim 1 wherein aid at least one storage tray is separated a predetermined distance from each of said at least two stackable removable grilling trays.

14. The unit of claim 1 further comprising a fuel line having at least one inlet and at least two outlets for connecting fuel to each of said burners of said grilling trays.

15. The unit of claim 14 further comprising a fuel source connected to said at least one inlet.

16. The unit of claim 15 wherein the fuel source is gas.

17. The unit of claim 16 wherein said gas is selected from propane, natural gas and combinations thereof.

18. A portable combination cooking and storage unit comprising:
    a housing having at top, a bottom, a front, a back and two sides, a first access door for accessing inside said unit, and a second access door for accessing inside said unit, said first access door being larger than said second access door and said first access door being above said second access door;
    at least two stackable removable grilling trays containable within said housing;
    at least two grilling tray receiving sections within said housing;
    at least one removable storage tray containable within said housing;
    at least one storage tray receiving section within said housing;

wherein each of said at least two grilling tray receiving sections are distant each other wherein each of said at least two removable grilling trays comprise at least one burner, a cooking grid proximate said at least one burner, and at least one burner control for controlling fuel to said at least one burner.

19. The unit of claim 2 or 18 wherein the first access door is at the front of said unit.

20. The unit of claim 10 or 18 wherein said second access door is at the front of said unit.

* * * * *